(12) United States Patent
Green et al.

(10) Patent No.: US 11,822,337 B2
(45) Date of Patent: *Nov. 21, 2023

(54) AUTONOMOUS VEHICLES FEATURING MACHINE-LEARNED YIELD MODEL

(71) Applicant: UATC, LLC, Mountain View, CA (US)

(72) Inventors: Colin Jeffrey Green, Pittsburgh, PA (US); Wei Liu, Pittsburgh, PA (US); David McAllister Bradley, Pittsburgh, PA (US); Vijay Subramanian, Canonsburg, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,464

(22) Filed: Nov. 8, 2021

(65) Prior Publication Data
US 2022/0066461 A1    Mar. 3, 2022

Related U.S. Application Data

(63) Continuation of application No. 16/003,543, filed on Jun. 8, 2018, now Pat. No. 11,175,671, which is a
(Continued)

(51) Int. Cl.
*G05D 1/02* (2020.01)
*G05D 1/00* (2006.01)
*B60W 30/095* (2012.01)
*B60W 30/18* (2012.01)
(Continued)

(52) U.S. Cl.
CPC ....... *G05D 1/0221* (2013.01); *B60W 30/0953* (2013.01); *B60W 30/0956* (2013.01);
(Continued)

(58) Field of Classification Search
CPC .. G05D 1/0221; G05D 1/0088; G05D 1/0223; B60W 30/0953; B60W 30/0956;
(Continued)

(56) References Cited

U.S. PATENT DOCUMENTS 8,788,134 B1    7/2014 Litkouhi et al.
8,954,252 B1    2/2015 Urmson et al.
(Continued)

*Primary Examiner* — Krishnan Ramesh
(74) *Attorney, Agent, or Firm* — Dority & Manning, P.A.

(57) ABSTRACT

The present disclosure provides autonomous vehicle systems and methods that include or otherwise leverage a machine-learned yield model. In particular, the machine-learned yield model can be trained or otherwise configured to receive and process feature data descriptive of objects perceived by the autonomous vehicle and/or the surrounding environment and, in response to receipt of the feature data, provide yield decisions for the autonomous vehicle relative to the objects. For example, a yield decision for a first object can describe a yield behavior for the autonomous vehicle relative to the first object (e.g., yield to the first object or do not yield to the first object). Example objects include traffic signals, additional vehicles, or other objects. The motion of the autonomous vehicle can be controlled in accordance with the yield decisions provided by the machine-learned yield model.

19 Claims, 9 Drawing Sheets

Related U.S. Application Data continuation of application No. 15/791,646, filed on Oct. 24, 2017, now Pat. No. 10,019,011.

(60) Provisional application No. 62/569,718, filed on Oct. 9, 2017.

(51) Int. Cl.
  *G08G 1/16* (2006.01)
  *G08G 1/01* (2006.01)
  *G08G 1/0962* (2006.01)

(52) U.S. Cl.
  CPC .......... *B60W 30/18109* (2013.01); *B60W 30/18154* (2013.01); *G05D 1/0088* (2013.01); *G05D 1/0223* (2013.01); *B60W 2555/60* (2020.02); *G05D 2201/0213* (2013.01); *G08G 1/0112* (2013.01); *G08G 1/0129* (2013.01); *G08G 1/09623* (2013.01); *G08G 1/166* (2013.01)

(58) Field of Classification Search
  CPC ..... B60W 30/18109; B60W 30/18154; B60W 2555/60; G08G 1/0129; G08G 1/09623
  USPC ............................................................ 701/23
  See application file for complete search history.

(56) References Cited

U.S. PATENT DOCUMENTS

| | | | |
|---|---|---|---|
| 9,120,484 B1 * | 9/2015 | Ferguson | G05D 1/0212 |
| 9,443,153 B1 | 9/2016 | Gupta et al. | |
| 9,558,659 B1 | 1/2017 | Silver et al. | |
| 10,101,745 B1 * | 10/2018 | Sun | G08G 1/163 |
| 2013/0184926 A1 * | 7/2013 | Spero | G05D 1/0088 |
| | | | 701/25 |
| 2015/0073663 A1 * | 3/2015 | Nilsson | B60W 50/0097 |
| | | | 701/41 |
| 2015/0344030 A1 * | 12/2015 | Damerow | G08G 1/166 |
| | | | 701/1 |
| 2016/0068156 A1 * | 3/2016 | Horii | B60W 30/18163 |
| | | | 701/28 |
| 2016/0161270 A1 * | 6/2016 | Okumura | G08G 1/096725 |
| | | | 701/23 |
| 2016/0314224 A1 * | 10/2016 | Wei | G06F 30/20 |
| 2017/0057514 A1 | 3/2017 | Toyoda et al. | |
| 2017/0102705 A1 * | 4/2017 | Silvlin | G08G 1/167 |
| 2017/0132334 A1 * | 5/2017 | Levinson | G01S 17/931 |
| 2017/0297569 A1 * | 10/2017 | Nilsson | G08G 1/205 |
| 2017/0329332 A1 * | 11/2017 | Pilarski | B60W 30/095 |
| 2018/0004204 A1 * | 1/2018 | Rider | B60K 35/00 |
| 2018/0025634 A1 * | 1/2018 | Ujiie | G08G 1/0962 |
| | | | 701/119 |
| 2018/0086336 A1 * | 3/2018 | Jones | B60W 30/09 |
| 2018/0089538 A1 * | 3/2018 | Graham | G06V 20/56 |
| 2018/0170388 A1 * | 6/2018 | Shin | G05D 1/0088 |
| 2018/0196415 A1 * | 7/2018 | Iagnemma | G01C 21/3438 |
| 2018/0196416 A1 * | 7/2018 | Iagnemma | G05D 1/0027 |
| 2018/0374360 A1 * | 12/2018 | Miao | G08G 1/0112 |
| 2019/0072969 A1 * | 3/2019 | Han | G05D 1/0088 |
| 2021/0110483 A1 * | 4/2021 | Shalev-Shwartz | G01C 21/3602 |

* cited by examiner

AUTONOMOUS VEHICLES FEATURING MACHINE-LEARNED YIELD MODEL

PRIORITY CLAIM

The present application is a continuation of U.S. application Ser. No. 16/003,543 having a filing date of Jun. 8, 2018, which claims the benefit of U.S. Non-Provisional application Ser. No. 15/791,646, patented as U.S. Pat. No. 10,019,011 on Jul. 10, 2018, which claims the benefit of U.S. Provisional Application Ser. No. 62/569,718 filed Oct. 9, 2017. Applicant claims priority to and benefit of all such applications and incorporates all such applications herein by reference in its entirety.

FIELD

The present disclosure relates generally to autonomous vehicle technology. More particularly, the present disclosure relates to autonomous vehicles that feature a machine-learned yield model.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to computing system that controls an autonomous vehicle. The computing system includes a machine-learned yield model configured to receive and process feature data descriptive of objects perceived by the autonomous vehicle and, in response, provide yield decisions for the autonomous vehicle relative to the objects. The computing system includes one or more processors and one or more non-transitory computer-readable media that collectively store instructions that, when executed by the one or more processors, cause the computing system to perform operations. The operations include obtaining first feature data descriptive of a first object perceived by the autonomous vehicle. The operations include inputting the first feature data into the machine-learned yield model. The operations include receiving a first yield decision as an output of the machine-learned yield model. The first yield decision describes a yield behavior for the autonomous vehicle relative to the first object.

Another example aspect of the present disclosure is directed to an autonomous vehicle. The autonomous vehicle includes a machine-learned yield model configured to receive and process feature data descriptive of objects perceived by the autonomous vehicle and, in response, provide yield decisions for the autonomous vehicle relative to the objects. The autonomous vehicle includes one or more processors and one or more non-transitory computer-readable media that collectively store instructions that, when executed by the one or more processors, cause the one or more processors to perform operations. The operations include obtaining first feature data descriptive of a first object perceived by the autonomous vehicle. The operations include inputting the first feature data into the machine-learned yield model. The operations include receiving a first yield decision as an output of the machine-learned yield model. The first yield decision describes a yield behavior for the autonomous vehicle relative to the first object.

Another example aspect of the present disclosure is directed to a computer-implemented method. The method includes obtaining, by a computing system that includes one or more computing devices, first feature data descriptive of a first object perceived by an autonomous vehicle. The method includes inputting, by the computing system, the first feature data into a machine-learned yield model. The method includes receiving, by the computing system, a first yield decision as an output of the machine-learned yield model. The first yield decision describes a yield behavior for the autonomous vehicle relative to the first object. The method includes generating a motion plan that executes the yield behavior described by the first yield decision output by the machine-learned yield model. The method includes controlling motion of the autonomous vehicle based at least in part motion plan.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
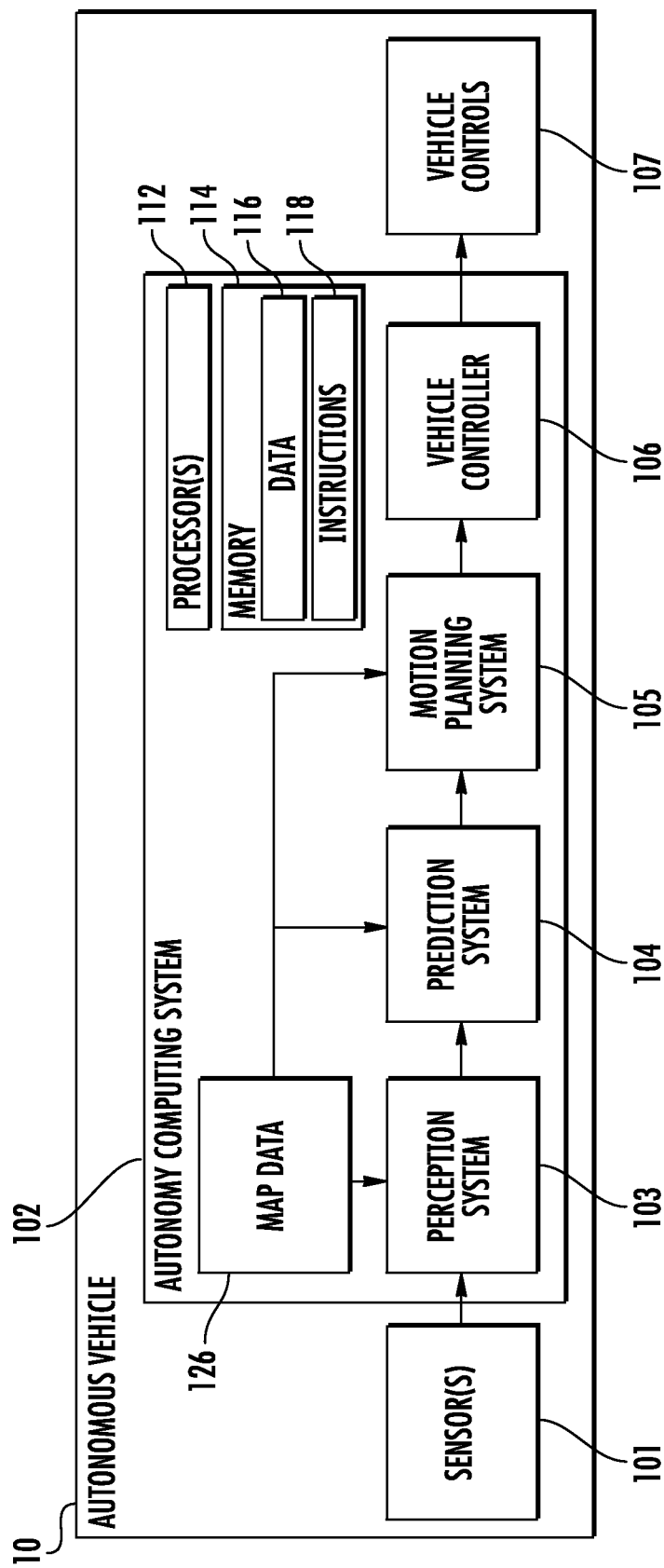
FIG. 1 depicts a block diagram of an example autonomous vehicle according to example embodiments of the present disclosure.

Generally, the present disclosure is directed to autonomous vehicle systems and methods that include or otherwise leverage a machine-learned yield model. In particular, the machine-learned yield model can be trained or otherwise configured to receive and process feature data descriptive of objects perceived by the autonomous vehicle and/or the surrounding environment and, in response to receipt of the feature data, provide yield decisions for the autonomous vehicle relative to the objects. For example, a yield decision for a first object can describe a yield behavior for the autonomous vehicle relative to the first object (e.g., yield to the first object or do not yield to the first object). Example objects include traffic signals, additional vehicles, or other objects. The motion of the autonomous vehicle can be controlled in accordance with the yield decisions provided by the machine-learned yield model.

Thus, the present disclosure provides a machine-learned yield model that can improve autonomous vehicle driving performance (e.g., safety, comfort, etc.) in various situations which require that yield decisions be made, including, as examples, traffic signals such as traffic lights (e.g., stop lights), traffic signs (e.g., stop signs or yield signs), or traffic markings (e.g., stop lines or other intersection markings); unprotected turns (e.g., unprotected left turn or right turn); continuing through an intersection in an unprotected manner; gridlock; or other yielding scenarios. Further, the machine-learned yield model represents a data-driven solution that reduces reliance on the generation and tuning of hand-crafted rules-based algorithms, which require significant time and expense to develop.

More particularly, in some implementations, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.). The autonomous vehicle can include an autonomy computing system that assists in controlling the autonomous vehicle. In some implementations, the autonomy computing system can include a perception system, a prediction system, and a motion planning system that cooperate to perceive the surrounding environment of the autonomous vehicle and determine a motion plan for controlling the motion of the autonomous vehicle accordingly.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), positioning system (e.g., GPS), and/or other sensors. The sensor data can include information that describes the location of objects within the surrounding environment of the autonomous vehicle. For example, the objects can include traffic signals, additional vehicles, pedestrians, bicyclists, and/or other objects In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop sign or yield sign), traffic lights (e.g., stop light), or other traffic signals or control devices/markings (e.g., cross walks)); and/or any other map data that provides information that assists the computing system in comprehending and perceiving its surrounding environment and its relationship thereto.

The perception system can identify one or more objects that are proximate to the autonomous vehicle based on sensor data received from the one or more sensors and/or the map data. In particular, in some implementations, the perception system can provide, for one or more of the objects, state data that describes a current state of such object. As examples, the state data for each object can describe an estimate of the object's: current location (also referred to as position); current speed (also referred to as velocity); current acceleration, current heading; current orientation; size/footprint (e.g., as represented by a bounding polygon); class (e.g., vehicle vs. pedestrian vs. bicycle), and/or other state information.

The prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planning system. In some implementations, predictions are provided only for objects of certain class(es).

The motion planning system can determine a motion plan for the autonomous vehicle based at least in part on the state data provided by the perception system and/or the predicted one or more future locations for the objects. Stated differently, given information about the current locations of proximate objects and/or predictions about the future locations of proximate objects, the motion planning system can determine a motion plan for the autonomous vehicle that best navigates the vehicle relative to the objects at their current and/or future locations. As one example, the motion planning system can include a trajectory generator that generates a trajectory for the autonomous vehicle.

As an example, in some implementations, the motion planning system operates to generate a new autonomous motion plan for the autonomous vehicle multiple times per second. Each new autonomous motion plan can describe motion of the autonomous vehicle over a planning window that spans the next several seconds (e.g., 5 seconds). Thus, in some example implementations, the motion planning system continuously operates to revise or otherwise generate a short-term motion plan based on the currently available data.

In some implementations, the motion planning system (e.g., the trajectory generator) can include an optimization planner that, for each instance of generating a new motion plan, searches (e.g., iteratively searches) over a motion planning space (e.g., a vehicle state space) to identify a motion plan that optimizes (e.g., locally optimizes) a total cost associated with the motion plan, as provided by one or more cost functions. For example, the motion plan can include a series of vehicle states and/or a series of controls to achieve the series of vehicle states. A vehicle state can include the autonomous vehicle's current location (also referred to as position); current speed (also referred to as velocity); current acceleration, current heading; current orientation; and/or other state information. As an example, in some implementations, the optimization planner can be or include an iterative linear quadratic regulator or similar iterative solver.

Once the optimization planner has identified the optimal motion plan (or some other iterative break occurs), the optimal candidate motion plan can be selected and executed by the autonomous vehicle. For example, the motion planning system can provide the selected motion plan to a vehicle controller that controls one or more vehicle controls (e.g., actuators that control gas flow, steering, braking, etc.) to execute the selected motion plan until the next motion plan is generated.

In some implementations, the motion planning system can employ or otherwise include one or more cost functions that, when evaluated, provide a total cost for a particular candidate motion plan. The optimization planner can search over a motion planning space (e.g., a vehicle state space) to identify a motion plan that optimizes (e.g., locally optimizes) the total cost provided by the one or more cost functions.

In some implementations, different cost function(s) can be used depending upon a particular scenario that is selected by the motion planning system. In particular, in some implementations, the motion planning system can include a plurality of scenario controllers that detect certain scenarios (e.g., a changing lanes scenario versus a queueing scenario) and guide the behavior of the autonomous vehicle according to the selected scenario. Different sets of one or more cost functions can correspond to the different possible scenarios and the cost function(s) corresponding to the selected scenario can be loaded and used by the motion planning system (e.g., the trajectory generator) at each instance of motion planning.

Thus, in some implementations, the motion planner or other portion of the autonomy computing system can include one or more scenario controllers that make discrete decisions regarding control of the autonomous vehicle according to different driving scenarios. As one example, the scenario controllers can include a yield controller that controls whether the autonomous vehicle yields to certain objects in the surrounding environment. Other example scenario controllers can include a pass, ignore, queue controller; a route selection/lane change controller; a speed regressor; and/or other controllers that make discrete decisions about how the autonomous vehicle should behave. In some implementations, the scenario controllers can make high-level decisions that correspond to or otherwise mimic human-level understanding and decision making about the surrounding environment (e.g., whether to yield to a particular object or not yield to a particular object). Once such discrete decisions have been made, the trajectory generator can generate a trajectory (e.g., through local optimization over a set of appropriate cost functions) that executes or otherwise complies with the decisions made by the scenario controller(s).

According to an aspect of the present disclosure, the autonomy computing system can include or otherwise leverage a machine-learned yield model. For example, the machine-learned yield model can be included in and/or employed by the motion planning system (e.g., included in and/or employed by the yield controller described above).

The machine-learned yield model can be trained or otherwise configured to receive and process feature data descriptive of objects perceived by the autonomous vehicle and/or the surrounding environment and, in response to receipt of the feature data, provide yield decisions for the autonomous vehicle relative to the objects.

As such, the autonomy computing system can determine one or more features associated with an object and/or the surrounding environment. For example, the features can be determined based at least in part on the state data associated with the object. In some implementations, the autonomy computing system can determine the feature(s) based at least in part on other information, such as the acquired map data. The feature(s) can be indicative of the movement (or lack thereof) and/or position of the object relative to items within the vehicle's surroundings and/or other information associated with the object. For example, the feature(s) can include a location of the object relative to a travel way (e.g., relative to the left or right lane markings), a location of the object relative to the autonomous vehicle (e.g., a distance between the current locations of the vehicle and the object), one or more characteristic(s) of the object relative to a travel route associated with the autonomous vehicle (e.g., whether the object is moving parallel, towards, or away from the vehicle's current/future travel route or a predicted point of intersection with the vehicle's travel route), etc. In some implementations, the feature(s) determined for a particular object may depend at least in part on the class of that object. For example, the predicted path for a vehicle or bicycle traveling on a roadway may be different than that associated with a pedestrian traveling on a sidewalk.

As another example, the feature data for an object can be descriptive of at least one of a required deceleration and a required acceleration associated with the first object. For example, the required deceleration can describe the amount of deceleration that will be required for the autonomous vehicle to yield to the object. In general, this can indicate how hard it will be to stop the autonomous vehicle (e.g., to avoid collision with the object or to comply with a traffic command provided or predicted to be provided by a traffic signal). As an example, the required deceleration for a traffic light can indicate the amount of deceleration required for the autonomous vehicle to come to a stop at or before a stop line associated with the traffic light. In some implementations, the required deceleration can be compared to one or more jerk limits to generate additional features. For example, the jerk limits can be actual jerk limits of the autonomous vehicle or can be artificial jerk limits associated with a boundary of acceptable passenger discomfort.

As a further example, the required acceleration associated with the first object can describe the amount of acceleration that will be required for the autonomous vehicle to not yield to the first object. For example, the required acceleration can describe an amount of acceleration that will be required to complete an unprotected left turn through an intersection prior to an oncoming vehicle entering the intersection or, as another example, an amount of acceleration that will be required to continue through an intersection prior to a traffic light transitioning to a red light. Similarly, the required acceleration can be compared to one or more jerk limit(s) to generate additional features.

As another example, in some implementations, the object for which the machine-learned yield model is providing a yield decision can be a traffic signal. In such instances, the feature data can be descriptive of various characteristics of the traffic signal such as, for example, a transition timing associated with the traffic signal. For example, the transition timing can describe how long a green light, yellow light, and/or red light typically lasts for a particular traffic light. In some instances, this information can be collected over time for each unique traffic signal (e.g., via "crowd-sourcing") and can be stored in the map data and accessed by the autonomy computing system. The feature data for a traffic signal might also describe a time point at which traffic signal last transitioned (e.g., as perceived by the autonomous vehicle using, for example, cameras).

Thus, in some implementations, given information describing the transition timing and also the last transition time point, the autonomous vehicle can determine a time remaining until a next subsequent signal transition (e.g., until the yellow light turns into a red light). Such information can be used as feature data for the object (e.g., the traffic signal). Additional example features associated with a traffic signal can include a stop line location associated with the traffic signal; a cross traffic line location associated with the traffic signal; and an exit point location associated with the traffic signal.

As another example, in some implementations, the feature data descriptive of the object(s) can include gap data descriptive of one or more gaps associated with one or more additional vehicles perceived by the autonomous vehicle. For example, in a turning scenario, gaps can be identified in which an intersection will be clear of oncoming traffic. In some implementations, the gaps associated with the additional vehicles can be temporal gaps that are predicted to occur. For example, the temporal gaps can be predicted based on predicted trajectories (e.g., predicted future locations) provided for the additional vehicles by the prediction system.

As one example, determining the gap data for the gaps can include: obtaining one or more predicted trajectories respectively generated for the one or more additional vehicles by the autonomous vehicle; identifying one or more yielding lanes through which the autonomous vehicle will traverse according to a proposed path; and determining the one or more gaps for the one or more yielding lanes based at least in part on the one or more predicted trajectories respectively generated for the one or more additional vehicles.

Example gap data descriptive of a gap can include gap start and/or end time (e.g., temporal length); predicted red light time (e.g., time at which a red light will be shown to oncoming traffic); the autonomous vehicle's distance to enter and/or exit a conflicting region associated with the gap; a required acceleration to travel through the gap; intersection type information (e.g., left turn lane vs. unprotected left vs. all-way-stop); and/or other gap information descriptive of proposed autonomous vehicle travel through the gap.

According to another aspect of the present disclosure, the autonomy computing system can determine a yield decision for the autonomous vehicle based at least in part on the feature(s) associated with object. To do so, the autonomous vehicle can include, employ, and/or otherwise leverage the machine-learned yield model. For example, the machine-learned model can be or can otherwise include one or more various model(s) such as, for example, decision tree-based models (e.g., random forest models such as boosted random forest classifiers), neural networks (e.g., deep neural networks), or other multi-layer non-linear models. Neural networks can include recurrent neural networks (e.g., long short-term memory recurrent neural networks), feed-forward neural networks, convolutional neural networks, and/or other forms of neural networks.

The autonomy computing system can input data indicative of at least the feature(s) for one or more objects into the machine-learned yield model and receive, as an output, data indicative of a recommended yield decision relative to the one or more objects. The yield decision can include yielding for the object by, for example, stopping a motion of the autonomous vehicle for the object. In some implementations, the yield decision can include not yielding for the object. For example, the output of the machine-learned model can indicate that the vehicle is to maintain its current speed and/or trajectory, without adjusting for the object's presence.

As another example, in implementations in which the feature data is descriptive of one or more gaps associated with additional vehicles, the yield decision provided for the object(s) can instruct the autonomous vehicle to proceed through a particular gap of the one or more gaps or to come to a stop. In particular, the yield controller can be used to select through which, if any, gap the autonomous vehicle should travel. For example, in some implementations, the machine-learned yield model can provide a score for each gap and one (or none) of the gaps can be selected on the basis of the scores. In some implementations, once a particular gap has been selected, the motion planning system can generate a gap penalty for the particular gap. For example, the gap penalty can be used to guide motion of the autonomous vehicle through the particular gap (e.g., by enforcing or otherwise guiding the optimization planner to generate motion plans that traverse the particular gap).

According to another aspect of the present disclosure, in some implementations, the machine learned yield model can be used to provide yield decisions for the autonomous vehicle at intersections. In particular, the machine learned yield model can be used to provide yield decisions for the autonomous vehicle which prevent gridlock or otherwise prevent the autonomous vehicle from blocking an intersection. As one example, if the intersection is busy and/or blocked with no space to exit the intersection once the autonomous vehicle enters, the yield model can provide a yield decision which indicates that the autonomous should not enter the intersection so long as a relatively gentle stop can be performed (e.g., does not require deceleration above a certain threshold). Conversely, if the intersection is not block or space is available for the autonomous vehicle to exit, the yield decision may indicate that the autonomous vehicle should proceed through the intersection.

In other implementations, the yield model may simply determine whether the autonomous vehicle will or will not cause gridlock and can use such determination to inform the ultimate yield decision. For example, the gridlock prediction can be used as an input feature for a downstream portion (e.g., sub-model) of the yield model that provides the yield decision.

In some implementations, application of the yield model to provide gridlock prevention decisions for an intersection can be viewed as an extension of the intersection gap scenario described above in which the availability of gaps is based on the ability of the autonomous vehicle to exit the intersection (e.g., the absence of additional vehicles or other objects in the intended lane which would prevent the autonomous vehicle from exiting the intersection).

In some implementations, the yield model can separately perform both gap-based analysis and decision making (e.g., as described above) and gridlock analysis and decision making. In some of such implementations, for each intersection, the model can perform gridlock analysis independently from the gap analysis, and the model can overwrite the yield decision(s) relative to gaps whenever those decision(s) will lead to an intersection blocking. In other implementations, the model can synthesize the gridlock analysis and the gap analysis to make a holistic yield decision (e.g., the gridlock analysis is simply used as an input to determine the final yield decision rather than overwriting the yield decision(s) relative to gaps). In such a way, the gridlock decision can be a portion or aspect of the ultimate yield decision.

In some implementations, the features used to make yield decisions which prevent gridlock can include the current position, velocity, and/or acceleration of a relevant object (e.g., the next vehicle ahead of the autonomous vehicle within the current lane, which may be referred to as the "lead vehicle") and/or the predicted position, velocity, and/or acceleration of the relevant object at the end of a certain time period (e.g., 10 seconds). Other example features include the current and/or predicted future values for the position, velocity, and/or acceleration of other objects such as, for example, the next vehicle in front of the lead vehicle.

Additional example features include the distance to the rear bumper of the lead vehicle in 10 seconds (which can be obtained from its location) and the distance to the crossing line (e.g., marking the exit of the other side of intersection). Using these two features an additional feature can be computed which is the amount of available space to queue. For example, an available space can equal the distance to the rear bumper of the lead vehicle minus the distance to the cross line. Another example feature can be a queueing space that describes a buffer desired between the lead vehicle and the autonomous vehicle.

Yet additional example features include a required deceleration to prevent the autonomous vehicle from entering the intersection, a status or characteristics of a traffic control signal (e.g., traffic light) associated with the intersection, or other features, as described above.

Thus, the machine-learned yield model can provide yield decisions that indicate whether the autonomous vehicle should enter an intersection or yield to the intersection (e.g., yield to the traffic signal (e.g., stop line or traffic light) that marks the beginning of such intersection).

Once the machine-learned yield model has provided one or more yield decisions for the autonomous vehicle relative to one or more objects (e.g., other vehicles, traffic signals, etc.), the autonomy computing system can plan the motion of the autonomous vehicle based at least in part on the determined yield decision. For example, the autonomy computing system can select and evaluate one or more cost functions indicative of a cost (e.g., over time) of controlling the motion of the autonomous vehicle (e.g., the trajectory, speed, or other controllable parameters of the autonomous vehicle) to perform a trajectory that executes or otherwise complies with the yield decision. For example, the autonomy computing system can implement an optimization algorithm that considers the cost functions associated with the yield decision determined by the machine-learned model as well as other cost functions (e.g., based on speed limits, traffic lights, etc.) to determine optimized variables that make up the motion plan. More generally, given a discrete decision about the yield behavior of the autonomous vehicle, the motion planning system can determine a motion plan for the autonomous vehicle that best navigates the vehicle while adhering to or otherwise executing the determined yield behavior.

The autonomous vehicle can control the autonomous vehicle to implement the motion plan. For example, the motion planning system can provide the selected motion plan to a vehicle controller that controls one or more vehicle controls (e.g., actuators that control gas flow, steering, braking, etc.) to execute the selected motion plan until the next motion plan is generated.

According to another aspect of the present disclosure, supervised training techniques can be performed to train the model to determine a yield decision based at least in part on the feature(s) associated with an object. For example, the machine-learned yield model can be trained based at least in part on log data annotated with yield labels. The log data can describe yield behaviors performed by vehicles (e.g., autonomous vehicles and/or humanly-operated vehicles) during previously conducted real-world driving sessions. As another example, the machine-learned yield model can be trained based at least in part on synthesized yield behaviors generated by playing forward or otherwise simulating certain scenarios that are described by log data.

As one example, the yield behaviors (e.g., either real-world or simulated) can be hand-labelled as positive training examples or negative training examples by a human reviewer. As another example, the yield behaviors can be automatically scored using scoring functions. For example, the scoring functions or other labelling rules can be derived from a data analysis of human driving behaviors and/or human passenger feedback. In some implementations, if the yield behavior receives a score that is greater than a first threshold (or less than depending on scoring style) the yield behavior can be labelled as a positive training example; while if the yield behavior receives a score that is less than a second threshold (or greater than depending on scoring style) the yield behavior can be labelled as a negative training example. In some implementations, the first threshold and the second threshold can be the same value. In some implementations, the first threshold and the second threshold can be different values and yield behaviors that receive scores between the first threshold and the second threshold can simply be discarded. In some implementations, the scores provided for the yield behaviors are included as labels to train the yield model, in addition or alternatively to a simple positive or negative label.

In some implementations, each training example can include a pair of outcomes for each of a decision to yield to the object and a decision to not yield to the object. In such implementations, each of the pair of outcomes can be scored and a positive label can be applied to the higher scoring outcome while a negative label is applied to the lower scoring outcome (or vice versa depending on scoring style). In some implementations, in the pair of scores for the pair of outcomes are not sufficiently separate (e.g., their difference is less than a third threshold), then such pair of outcomes can be discarded as a poor training example.

The systems, methods, and vehicles described herein may provide a number of technical effects and benefits. For instance, the autonomy computing system can locally (e.g., on-board the vehicle) detect an object, evaluate its features (e.g., speed, location, path) relative to the vehicle and/or the surroundings, and adjust the yield behavior of the vehicle accordingly. By performing such an operation on-board the autonomous vehicle, the autonomy computing system can avoid the latency issues that arise by communicating with a remote computing system. The autonomy computing system can be configured to continuously perform this iterative optimization process as the vehicle travels and different objects become proximate to the autonomous vehicle. As such, the autonomy computing system can proactively control the motion of the autonomous vehicle to avoid sudden movements that place stress on the vehicle's systems and confuse or frighten users (e.g., passengers of the vehicle). Moreover, the autonomous vehicle can operate in a manner that is safer for the objects in the vehicle's surroundings.

The systems, methods, and vehicles described herein also provide an improvement to vehicle computing technology, such as autonomous vehicle computing technology. For instance, aspects of the present disclosure enable an autonomy computing system to more efficiently and accurately control the vehicle's motion. For example, the systems and methods of the present disclosure can allow one or more computing devices on-board an autonomous vehicle to determine a yield decision for the autonomous vehicle based at least in part on a machine-learned yield model and one or more features associated with the object. By utilizing the machine-learned yield model, the autonomous vehicle can avoid the use of a rules-based determination system, which can be less effective and flexible for yield decision determination. Moreover, the machine-learned yield model can be more easily adjusted (e.g., via refinement training) than a rules-based system (e.g., requiring re-written rules or manually tuned parameters) as the autonomy computing system is periodically updated to handle new scenarios. This can allow for more efficient upgrading of the autonomy computing system, leading to less vehicle downtime.

The disclosed systems, methods and vehicles have a technical effect and benefit of improved scalability by using a machine-learned yield model to determine yield decisions relative to detected objects. In particular, modeling feature data and determining appropriate yield decisions through machine-learned models greatly reduces the research time needed relative to development of hand-crafted yield decision rules. For example, for hand-crafted yield decision rules, a designer would need to exhaustively derive heuristic models of how different vehicles would need to react in different scenarios. It can be difficult to create hand-crafted rules that effectively address all possible scenarios that an autonomous vehicle may encounter relative to detected objects. In addition, hand-crafted rules for determining yield decisions relative to objects may not easily scale from one location to another. For instance, how a vehicle should behave around pedestrians may be different in Pittsburgh, PA as opposed to New York City, NY or in the United States versus another country. As such, it can be difficult to create effective hand-crafted rules, and even more so to create different sets of hand-crafted rules for different locations. By contrast, to use machine-learned models as described herein, a yield model can be trained on appropriate training data, which can be done at a massive scale if the training system permits. In addition, the machine-learned models can easily be revised as new training data is made available. As such, use of a machine-learned yield model trained on driving logs specific to a particular location can provide a scalable and customizable solution.

The disclosed systems, methods and vehicles have an additional technical effect and benefit of improved adaptability and opportunity to realize improvements in related autonomy systems by using a machine-learned yield model to determine yield decisions relative to detected objects. An autonomy system can include numerous different subsystems (e.g., perception, prediction, motion planning, etc.) that jointly operate to determine a vehicle's motion plan. As technology improvements to one subsystem are introduced, a machine-learned yield model can capitalize on those improvements to create a further refined and more accurate determination of yield decisions relative to objects, for example, by simply retraining the existing model on new training data captured by the improved autonomy subsystems. Thus, obtaining yield decision determinations based on newly available data types may be more easily achievable by a machine-learned yield model as opposed to hand-crafted algorithms.

The systems and methods described herein may also provide a technical effect and benefit of improved computer technology in the form of a relatively low memory usage/requirement. In particular, the machine-learned models described herein effectively summarize vehicle driving logs or other training data and compress it into compact form (e.g., the machine-learned model itself). This greatly reduces the amount of memory needed to store and implement the algorithm(s) for determining yield decisions relative to objects within the vehicle's surroundings. The use of machine-learned models can also enable decisions to be made at very fast speeds.

With reference now to the Figures, example embodiments of the present disclosure will be discussed in further detail.

Example Devices and Systems

FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.).

The autonomous vehicle 10 includes one or more sensors 101, an autonomy computing system 102, and one or more vehicle controls 107. The autonomy computing system 102 can assist in controlling the autonomous vehicle 10. In particular, the autonomy computing system 102 can receive sensor data from the one or more sensors 101, attempt to comprehend the surrounding environment by performing various processing techniques on data collected by the sensors 101, and generate an appropriate motion path through such surrounding environment. The autonomy computing system 102 can control the one or more vehicle controls 107 to operate the autonomous vehicle 10 according to the motion path.

The autonomy computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause autonomy computing system 102 to perform operations.

As illustrated in FIG. 1, the autonomy computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the autonomy computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the autonomy computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

In particular, according to an aspect of the present disclosure, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

More particularly, to evaluate the one or more cost functions, the motion planning system 105 can determine a plurality of features that are within a feature space. For example, the status of each feature can be derived from the state of the vehicle and/or the respective states of other objects or aspects of the surrounding environment.

The motion planning system 105 can determine the plurality of features for each vehicle state included in the current candidate motion plan. The motion planning system 105 can determine the plurality of features for each vehicle state included in the candidate motion plan.

The motion planning system 105 can evaluate one or more cost functions based on the determined features. For example, in some implementations, the one or more cost functions can include a respective linear cost for each feature at each state.

The motion planning system 105 can iteratively optimize the one or more cost functions to minimize a total cost associated with the candidate motion plan. For example, the motion planning system 105 can include an optimization planner that iteratively optimizes the one or more cost functions.

Following optimization, the motion planning system 105 can provide the optimal motion plan to a vehicle controller 106 that controls one or more vehicle controls 107 (e.g., actuators or other devices that control gas flow, steering, braking, etc.) to execute the optimal motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 2:
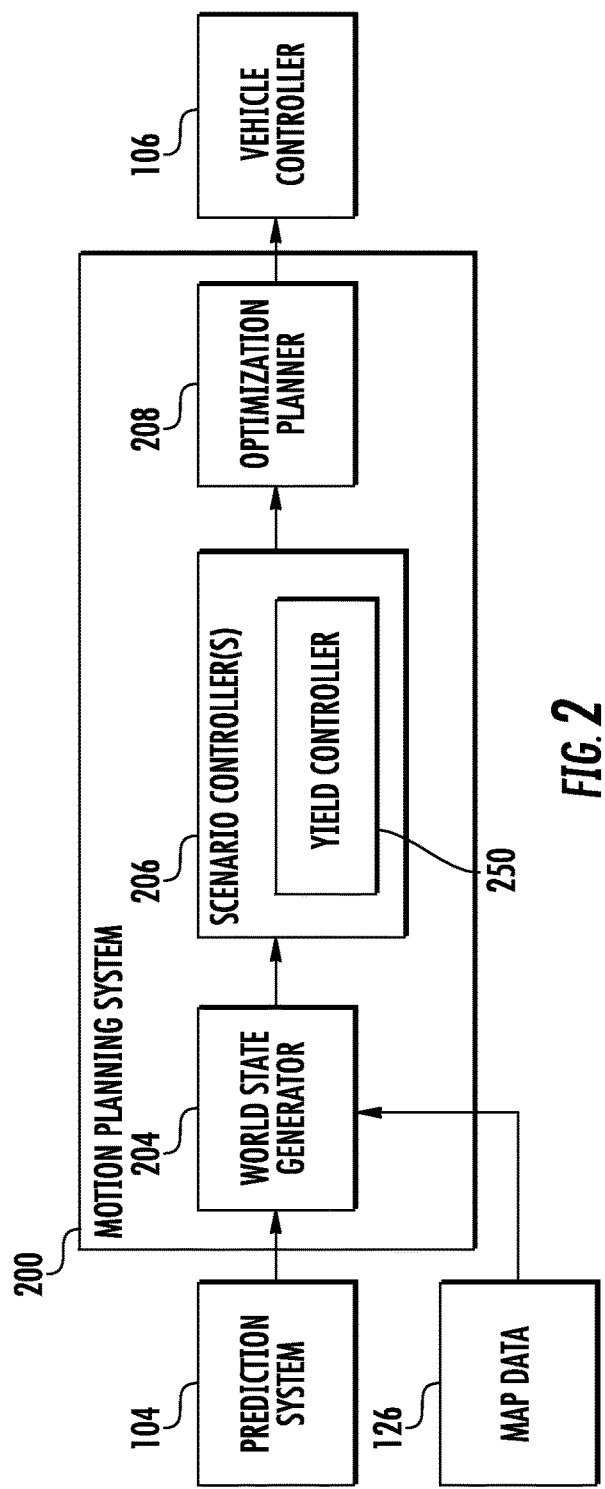
FIG. 2 depicts a block diagram of an example motion planning system according to example embodiments of the present disclosure.

FIG. 2 depicts a block diagram of an example motion planning system 200 according to example embodiments of the present disclosure. The example motion planning system 200 includes a world state generator 204, one or more scenario controllers 206, and an optimization planner 208.

The world state generator 204 can receive information from the prediction system 104, the map data 126, and/or other information such as vehicle pose, a current route, or other information. The world state generator 204 can synthesize all received information to produce a world state that describes the state of all objects in and other aspects of the surrounding environment of the autonomous vehicle at each time step.

The scenario controller(s) 206 can detect certain scenarios (e.g., a changing lanes scenario versus a queueing scenario) and guide the behavior of the autonomous vehicle according to the selected scenario. Thus, the scenario controller(s) can make discrete-type decisions (e.g., should the autonomous vehicle turn left, turn right, change lanes, etc.) and can control motion of the vehicle based on such decisions. In some implementations, each of the scenario controller(s) 206 can be or include a classifier (e.g., a machine-learned classifier) or other model designed to classify the current state of the world as either included or excluded from one or more corresponding scenarios. In some implementations, the scenario controller(s) 206 can operate at each time step.

As examples, the scenario controllers 206 can include one or more of: a pass, ignore, queue controller that decides, for each object in the world, whether the autonomous vehicle should pass, ignore, or queue such object; a yield controller that decides, for each adjacent vehicle in the world, whether the autonomous vehicle should yield to such vehicle; a lane change controller that identifies whether and when to change lanes; and/or a speed regressor that determines an appropriate driving speed for each time step. These scenario controllers 206 are provided as examples only. Alternative and/or additional scenario controllers 206 can be used. In some implementations of the present disclosure, the motion planning system 200 does not include or implement the scenario controllers 206.

More particularly, according to an aspect of the present disclosure, the scenario controller(s) 206 can include a yield controller 250. For example, the yield controller 250 can control whether the autonomous vehicle yields to certain objects in the surrounding environment. In some implementations, the yield controller 250 can make high-level decisions that correspond to or otherwise mimic human-level understanding and decision making about the surrounding environment (e.g., whether to yield to a particular object or not yield to a particular object).

According to an aspect of the present disclosure, the yield controller 250 can include or otherwise leverage a machine-learned yield model. The machine-learned yield model can be trained or otherwise configured to receive and process feature data descriptive of objects perceived by the autonomous vehicle and/or the surrounding environment and, in response to receipt of the feature data, provide yield decisions for the autonomous vehicle relative to the objects.

As such, the yield controller 250 can determine or receive data descriptive of one or more features associated with an object and/or the surrounding environment. For example, the features can be determined based at least in part on the state data associated with the object. In some implementations, the yield controller 250 can determine the feature(s) based at least in part on other information, such as the acquired map data. The feature(s) can be indicative of the movement (or lack thereof) and/or position of the object relative to items within the vehicle's surroundings and/or other information associated with the object. For example, the feature(s) can include a location of the object relative to a travel way (e.g., relative to the left or right lane markings), a location of the object relative to the autonomous vehicle (e.g., a distance between the current locations of the vehicle and the object), one or more characteristic(s) of the object relative to a travel route associated with the autonomous vehicle (e.g., whether the object is moving parallel, towards, or away from the vehicle's current/future travel route or a predicted point of intersection with the vehicle's travel route), etc. In some implementations, the feature(s) determined for a particular object may depend at least in part on the class of that object. For example, the predicted path for a vehicle or bicycle traveling on a roadway may be different than that associated with a pedestrian traveling on a sidewalk.

As another example, the feature data for an object can be descriptive of at least one of a required deceleration and a required acceleration associated with the first object. For example, the required deceleration can describe the amount of deceleration that will be required for the autonomous vehicle to yield to the object. In general, this can indicate how hard it will be to stop the autonomous vehicle (e.g., to avoid collision with the object or to comply with a traffic command provided or predicted to be provided by a traffic signal). As an example, the required deceleration for a traffic light can indicate the amount of deceleration required for the autonomous vehicle to come to a stop at or before a stop line associated with the traffic light. In some implementations, the required deceleration can be compared to one or more jerk limits to generate additional features. For example, the jerk limits can be actual jerk limits of the autonomous vehicle or can be artificial jerk limits associated with a boundary of acceptable passenger discomfort.

As a further example, the required acceleration associated with the first object can describe the amount of acceleration that will be required for the autonomous vehicle to not yield to the first object. For example, the required acceleration can describe an amount of acceleration that will be required to complete an unprotected left turn through an intersection prior to an oncoming vehicle entering the intersection or, as another example, an amount of acceleration that will be required to continue through an intersection prior to a traffic light transitioning to a red light. Similarly, the required acceleration can be compared to one or more jerk limit(s) to generate additional features.

As another example, in some implementations, the object for which the yield controller 250 is providing a yield decision can be a traffic signal. In such instances, the feature data can be descriptive of various characteristics of the traffic signal such as, for example, a transition timing associated with the traffic signal. For example, the transition timing can describe how long a green light, yellow light, and/or red light typically lasts for a particular traffic light. In some instances, this information can be collected over time for each unique traffic signal (e.g., via "crowd-sourcing") and can be stored in the map data and accessed by the autonomy computing system. The feature data for a traffic signal might also describe a time point at which traffic signal last transitioned (e.g., as perceived by the autonomous vehicle using, for example, cameras).

Thus, in some implementations, given information describing the transition timing and also the last transition time point, the yield controller 250 can determine a time remaining until a next subsequent signal transition (e.g., until the yellow light turns into a red light). Such information can be used as feature data for the object (e.g., the traffic signal).

Additional example features associated with a traffic signal can include a stop line location associated with the traffic signal; a cross traffic line location associated with the traffic signal; and an exit point location associated with the traffic signal. For example, the stop line location can be a location at which a traffic marking (e.g., a stop line) exists within the travelway and indicates that such location is the appropriate or requested place for vehicles to come to a stop to comply with the traffic signal. For example, the cross traffic line location can be a location at which the vehicle will first encounter or otherwise be exposed to traffic from other lanes or directions and can, in some instances, generally correspond to ("entering the intersection"). For example, the exit point can be a location at which the vehicle will be considered as exiting the intersection or otherwise compliant with or entered into a subsequent state (e.g., lane) that is beyond the intersection.

Thus, in various implementations, the yield controller 250 can receive information from the prediction system, information regarding traffic signal predictions, information regarding a proposed route of the autonomous vehicle, and/or map information. The yield controller 250 can make yield decisions that indicate whether and how the autonomous vehicle should yield to objects. The motion planning system can generate a trajectory based on the yield decisions.

As another example, in some implementations, the feature data descriptive of the object(s) can include gap data descriptive of one or more gaps associated with one or more additional vehicles perceived by the autonomous vehicle. For example, in a turning scenario, the yield controller 250 can identify gaps in which an intersection will be clear of oncoming traffic. In some implementations, the gaps associated with the additional vehicles can be temporal gaps that are predicted to occur. For example, the temporal gaps can be predicted based on predicted trajectories (e.g., predicted future locations) provided for the additional vehicles by the prediction system.

As one example, determining the gap data for the gaps can include: obtaining one or more predicted trajectories respectively generated for the one or more additional vehicles by the autonomous vehicle; identifying one or more yielding lanes through which the autonomous vehicle will traverse according to a proposed path; and determining the one or more gaps for the one or more yielding lanes based at least in part on the one or more predicted trajectories respectively generated for the one or more additional vehicles.

Figure 4A:
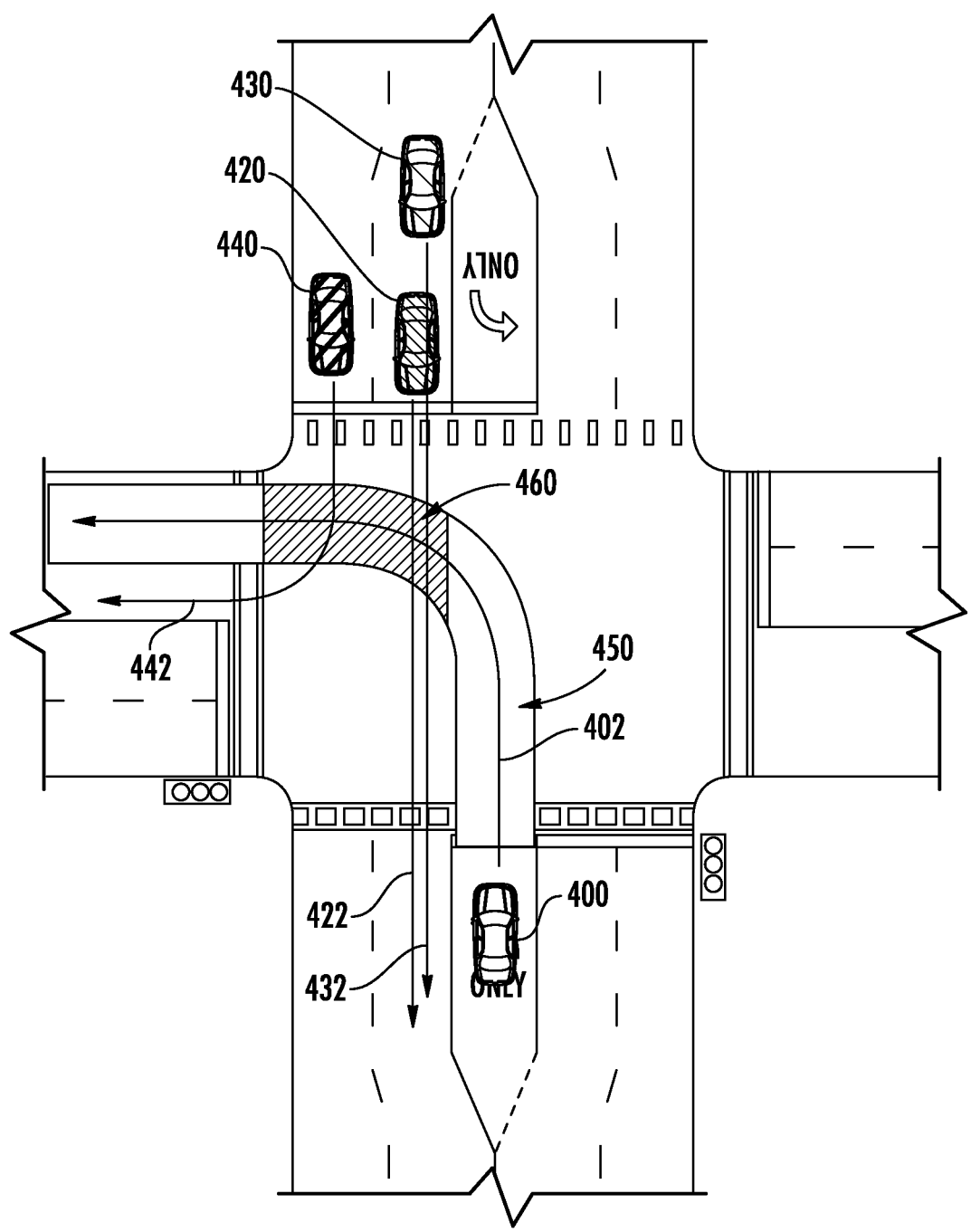
FIG. 4A depicts graphical diagram of an example driving scenario according to example embodiments of the present disclosure.

As one example, FIG. 4A depicts graphical diagram of an example driving scenario according to example embodiments of the present disclosure. An autonomous vehicle 400 has a proposed or desired route 402 that includes an unprotected left turn. The route 402 proceeds through or otherwise implicates a series of lane segments 450.

A number of additional vehicles 420, 430, and 440 are perceived by the autonomous vehicle 400 and the autonomous vehicle 400 has predicted a respective trajectory 422, 432, and 442 for each of the additional vehicles.

The autonomous vehicle 400 can determine (e.g., based on the lane segments 450 and/or the predicted trajectories 422, 432, and 442) a conflicting region 460 that includes one or more yielding lanes through which the autonomous vehicle 400 will traverse according to the proposed path 402. The autonomous vehicle 400 can determine one or more gaps for the one or more yielding lanes based on the predicted trajectories 422, 432, and 442 respectively for the additional vehicles 420, 430, and 440.

Figure 4B:
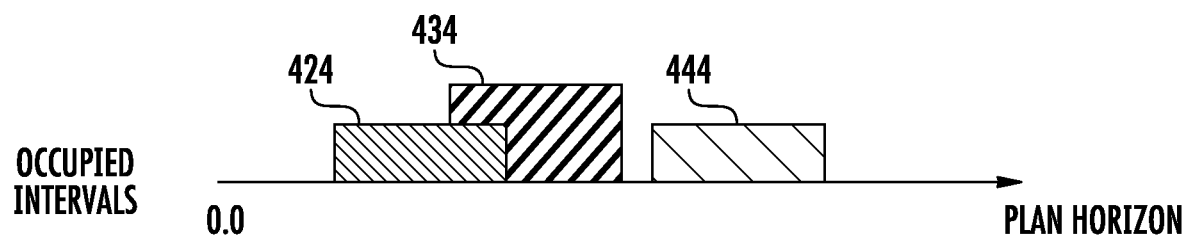
FIG. 4B depicts a graphical diagram of example occupied intervals according to example embodiments of the present disclosure.

As an example, FIG. 4B depicts a graphical diagram of example occupied intervals for the conflicting region 460 according to example embodiments of the present disclosure. The x axis corresponds to time. In particular, an occupied interval 424 corresponds to a time at which vehicle 420 will occupy the conflicting region 460 (e.g., occupy one or more of the yielding lanes); an occupied interval 434 corresponds to a time at which vehicle 440 will occupy the conflicting region 460; and an occupied interval 444 corresponds to a time at which vehicle 430 will occupy the conflicting region 460. The autonomous vehicle 400 can determine one or more gaps based on the occupied intervals 424, 434, and 444.

Figure 4C:
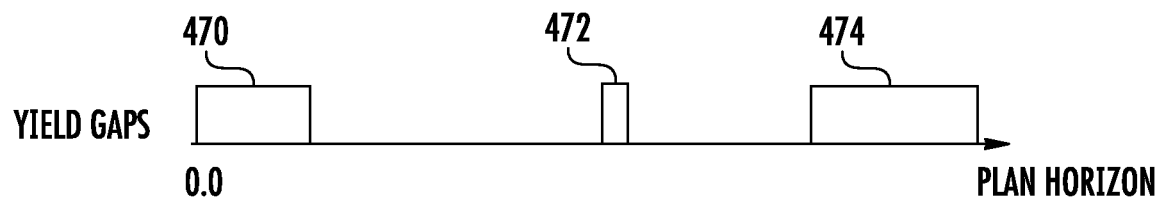
FIG. 4C depicts a graphical diagram of example yield gaps according to example embodiments of the present disclosure.

As an example, FIG. 4C depicts a graphical diagram of example yield gaps according to example embodiments of the present disclosure. A first gap 470 occurs prior to occupied intervals 424 and 434; a second gap 472 occurs between occupied intervals 434 and 444; and a third gap 474 occurs after occupied interval 444.

Example gap data descriptive of each of the gaps 470, 472, and 474 can include respective gap start and/or end time (e.g., temporal length); predicted red light time (e.g., time at which a red light will be shown to oncoming traffic); the autonomous vehicle's distance to enter and/or exit the conflicting region 460 associated with the gap; a required acceleration to travel through the gap; intersection type information (e.g., left turn lane vs. unprotected left vs. all-way-stop, etc.); and/or other gap information descriptive of proposed autonomous vehicle travel through the gap.

Referring again to FIG. 2, according to another aspect of the present disclosure, the yield controller 250 can determine a yield decision for the autonomous vehicle based at least in part on the feature(s) associated with object. To do so, the yield controller 250 can include, employ, and/or otherwise leverage the machine-learned yield model. For example, the machine-learned model can be or can otherwise include one or more various model(s) such as, for example, decision tree-based models (e.g., random forest models such as boosted random forest classifiers), neural networks (e.g., deep neural networks), or other multi-layer non-linear models. Neural networks can include recurrent neural networks (e.g., long short-term memory recurrent neural networks), feed-forward neural networks, convolutional neural networks, and/or other forms of neural networks.

The yield controller 250 can input data indicative of at least the feature(s) for one or more objects into the machine-learned yield model and receive, as an output, data indicative of a recommended yield decision relative to the one or more objects. The yield decision can include yielding for the object by, for example, stopping a motion of the autonomous vehicle for the object. In some implementations, the yield decision can include not yielding for the object. For example, the output of the machine-learned model can indicate that the vehicle is to maintain its current speed and/or trajectory, without adjusting for the object's presence.

As another example, in implementations in which the feature data is descriptive of one or more gaps associated with additional vehicles, the yield decision provided for the object(s) can instruct the autonomous vehicle to proceed through a particular gap of the one or more gaps or to come to a stop. In particular, the yield controller 250 can select through which, if any, gap the autonomous vehicle should travel.

Figure 5:
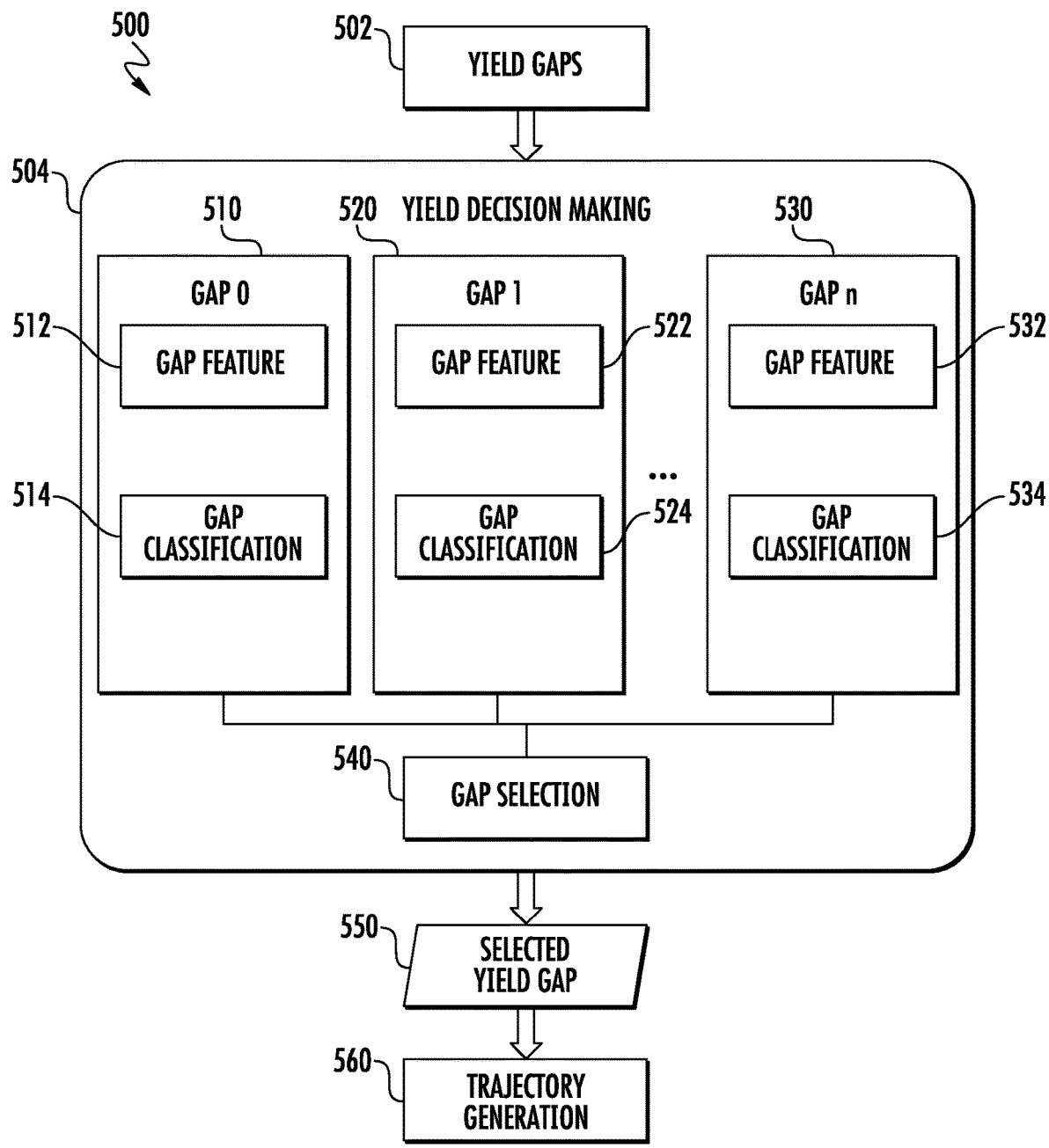
FIG. 5 depicts a block diagram of an example yield controller according to example embodiments of the present disclosure.

As one example, FIG. 5 depicts a block diagram of an example yield controller workflow according to example embodiments of the present disclosure. At 502, a component can extract yield gap information. For example, the yield gap information can be identification of the timing associated with each yield gap.

At 504, a component performs yield decision making on the basis of the yield gap information 502. In particular, at 504, each of a number of gaps (e.g., n gaps) can be individually evaluated. For example, a $0^{th}$ gap 510 can have gap feature data 512; a $1^{st}$ gap 520 can have gap feature data 522; and an $n^{th}$ gap 530 can have gap feature data 532. The gap features 512, 522, and 532 can be extracted by the yield gap component 502 and/or the yield decision making component 504.

The yield decision making component 504 can score or otherwise evaluate each gap 510, 520, and 530 on the basis of its respective gap features 512, 522, 532. For example, the machine-learned yield model can be used to provide a gap classification 514, 524, and 534 respectively for the gaps 510, 520, and 530. Each gap classification 512, 522, and 532 can correspond to a yield decision or an initial preliminary yield decision relative to the corresponding gap. In some implementations, each gap classification 512, 522, and 532 can provide or include a score or other metric (e.g., confidence value) that describes an ability of the autonomous vehicle to traverse of the corresponding gap. However, in other implementations, each gap classification 512, 522, and 532 simply provides a binary yield/do not yield decision for the corresponding gap.

The yield decision making component 504 can include a gap selection component 540 that selects a selected yield gap 550 based on the gap classifications 512, 522, and 532. As one example, the first gap (e.g., temporally speaking) to receive a do not yield classification can be selected as the selected yield gap 550. If none of the gaps received a do not yield decision, then a stop decision can be selected. As another example, the first gap (e.g., temporally speaking) to receive a score greater than a threshold value can be selected as the selected yield gap 550. If none of the gaps received a score greater than the threshold, then a stop decision can be selected. Other selection logic can be used as well (e.g., simply select the gap that received the highest score).

Once a particular gap has been selected as the selected yield gap 550, a trajectory for the autonomous vehicle can be generated by a trajectory generation component 560. For example, the trajectory generation component 560 can correspond to or be included in the optimization planner 208 and/or the yield controller 250.

In some implementations, the trajectory generation component 560 can generate a gap penalty for the selected yield gap 550. For example, the gap penalty can be used to guide motion of the autonomous vehicle through the particular gap (e.g., by enforcing or otherwise guiding the optimization planner to generate motion plans that traverse the selected yield gap 550).

Figure 6:
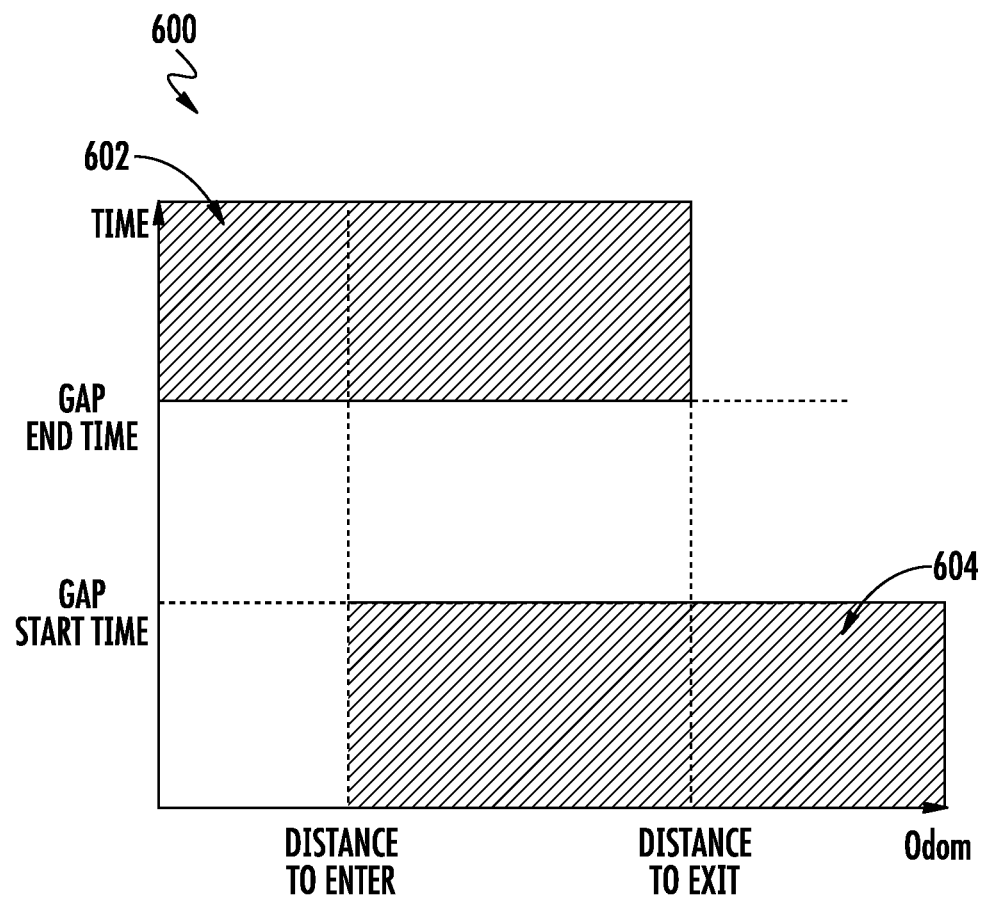
FIG. 6 depicts a graphical diagram of an example gap penalty according to example embodiments of the present disclosure.

As one example, FIG. 6 depicts a graphical diagram of an example gap penalty 600 according to example embodiments of the present disclosure. The gap penalty includes a push fence 602 and a stop fence 604. As an example, the stop fence 604 can be placed at the conflicting region enter point before the gap starts. The can prevent the autonomous vehicle from entering the conflicting region prior to the gap start time. As another example, the push fence 602 can be placed at the conflicting region exit point after the gap ends. This can force the autonomous vehicle to exit the conflicting region prior to the gap end time.

If no feasible gaps are selected (e.g., a stop plan is selected), then a stop fence can be placed at the intersection stop line to simply stop the autonomous vehicle from entering the conflicting region.

Referring again to FIG. 2, according to another aspect of the present disclosure, in some implementations, the yield controller 250 can use the machine learned yield model provide yield decisions for the autonomous vehicle at intersections which prevent gridlock or otherwise prevent the autonomous vehicle from blocking an intersection. As one example, if the intersection is busy and/or blocked with no space to exit the intersection once the autonomous vehicle enters, the yield model can provide a yield decision which indicates that the autonomous should not enter the intersection so long as a relatively gentle stop can be performed (e.g., does not require deceleration above a certain threshold). Conversely, if the intersection is not blocked or space is available for the autonomous vehicle to exit, the yield decision may indicate that the autonomous vehicle should proceed through the intersection.

In other implementations, the yield model may simply determine whether the autonomous vehicle will or will not cause gridlock and can use such determination to inform the ultimate yield decision provided by the yield controller 250. For example, the gridlock prediction can be used as an input feature for a downstream portion (e.g., sub-model) of the yield model that provides the yield decision.

In some implementations, application of the yield model to provide gridlock prevention decisions for an intersection can be viewed as an extension of the intersection gap scenario described above in which the availability of gaps is based on the ability of the autonomous vehicle to exit the intersection (e.g., the absence of additional vehicles or other objects in the intended lane which would prevent the autonomous vehicle from exiting the intersection).

In some implementations, the yield controller 250 can separately perform both gap-based analysis and decision making (e.g., as described above) and gridlock analysis and decision making. In some of such implementations, for each intersection, the yield controller 250 can use the yield model to perform gridlock analysis independently from the gap analysis, and the yield controller 250 can overwrite the initial yield decision(s) relative to gaps whenever those decision(s) will lead to an intersection blocking. In other implementations, the yield controller 250 can synthesize the gridlock analysis and the gap analysis to make a holistic yield decision (e.g., the gridlock analysis is simply used as an input to determine the final yield decision rather than overwriting the yield decision(s) relative to gaps). In such a way, the gridlock decision can be a portion or aspect of the ultimate yield decision.

In some implementations, the features used to make yield decisions which prevent gridlock can include the current position, velocity, and/or acceleration of a relevant object (e.g., the next vehicle ahead of the autonomous vehicle within the current lane, which may be referred to as the "lead vehicle") and/or the predicted position, velocity, and/or acceleration of the relevant object at the end of a certain time period (e.g., 10 seconds). Other example features include the current and/or predicted future values for the position, velocity, and/or acceleration of other objects such as, for example, the next vehicle in front of the lead vehicle.

Additional example features include the distance to the rear bumper of the lead vehicle in 10 seconds (which can be obtained from its location) and the distance to the crossing line (e.g., marking the exit of the other side of intersection). Using these two features an additional feature can be computed which is the amount of available space to queue. For example, an available space can equal the distance to the rear bumper of the lead vehicle minus the distance to the cross line. Another example feature can be a queueing space that describes a buffer desired between the lead vehicle and the autonomous vehicle.

Yet additional example features include a required deceleration to prevent the autonomous vehicle from entering the intersection, a status or characteristics of a traffic control signal (e.g., traffic light) associated with the intersection, or other features, as described above.

Thus, the yield controller 250 can provide yield decisions that indicate whether the autonomous vehicle should enter an intersection or yield to the intersection (e.g., yield to the traffic signal (e.g., stop line or traffic light) that marks the beginning or entry of such intersection).

Once the yield controller 250 has provided one or more yield decisions for the autonomous vehicle relative to one or more objects (e.g., other vehicles, traffic signals, etc.), the motion planning system 200 can plan the motion of the autonomous vehicle based at least in part on the determined yield decision. For example, the motion planning system 200 can select and evaluate one or more cost functions indicative of a cost (e.g., over time) of controlling the motion of the autonomous vehicle (e.g., the trajectory, speed, or other controllable parameters of the autonomous vehicle) to perform a trajectory that executes or otherwise complies with the yield decision.

In particular, according to another aspect of the present disclosure, the motion planning system 200 can include an optimization planner 208 that searches (e.g., iteratively searches) over a motion planning space (e.g., an available control space) to identify a motion plan that optimizes (e.g., locally optimizes) a total cost associated with the motion plan. For example, the optimization planner can iteratively evaluate and modify a candidate motion plan until the total cost is optimized.

Figure 3:
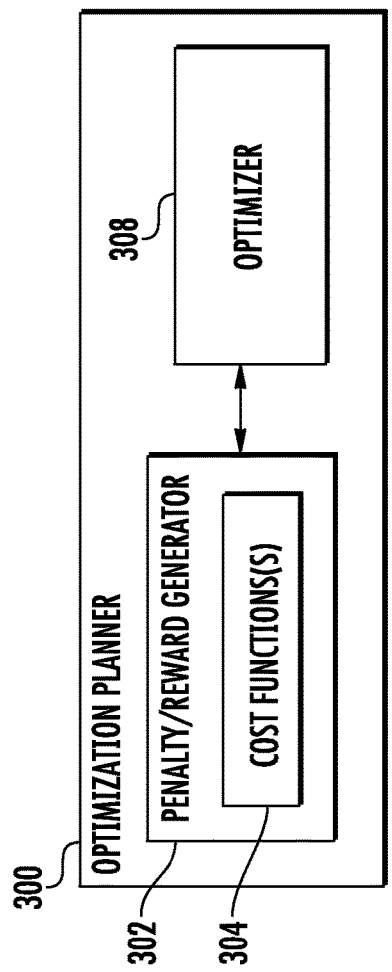
FIG. 3 depicts a block diagram of an example optimization planner according to example embodiments of the present disclosure.

FIG. 3 depicts a block diagram of an example optimization planner 300 according to example embodiments of the present disclosure. As described above, the optimization planner 300 can iteratively search over a motion planning space (e.g., an available control space) to identify a motion plan that optimizes (e.g., locally optimizes) a total cost associated with the motion plan. In particular, the example optimization planner 300 can implement an optimizer 308 to optimize the total cost. The optimizer 308 can be or include a solver (e.g., an iterative solver) or other optimization tool that is able to optimize the total cost. In some implementations, the optimizer 308 is an iterative linear quadratic regulator.

According to an aspect of the present disclosure, the total cost can be based at least in part on one or more cost functions 304. In one example implementation, the total cost equals the sum of all costs minus the sum of all rewards and the optimization planner attempts to minimize the total cost. The cost functions 304 can be evaluated by a penalty/reward generator 302.

In some implementations, different cost function(s) 304 can be used depending upon a particular scenario that is provided to the optimization planner 300. For example, as described above, a motion planning system can include a plurality of scenario controllers that detect certain scenarios (e.g., a changing lanes scenario versus a queueing scenario) and guide the behavior of the autonomous vehicle according to the selected scenario. Different sets of one or more cost functions 304 can correspond to the different possible scenarios and a penalty/reward generator can load the cost function(s) 304 corresponding to the selected scenario at each instance of motion planning. Thus, the yield decision(s) provided by the yield controller 250 can be used to guide selection, design, and/or use of certain cost function(s) 304 so as to effectuate the yield decision(s).

In other implementations, the same cost function(s) 304 can be used at each instance of motion planning (e.g., no particular scenarios are used). In some implementations, the optimization planner 300 does not include the penalty/reward generator 302.

To provide an example cost function 304 for the purpose of illustration: a first example cost function can provide a first cost that is negatively correlated to a magnitude of a first distance from the autonomous vehicle to a lane boundary. Thus, if a candidate motion plan approaches a lane boundary, the first cost increases, thereby discouraging (e.g., through increased cost penalization) the autonomous vehicle from selecting motion plans that come close to or cross over lane boundaries. This first example cost function is provided only as an example cost function to illustrate the principle of cost. The first cost function is not required to implement the present disclosure. Many other and different cost functions 304 can be employed in addition or alternatively to the first cost function described above.

Furthermore, in some implementations, the cost function(s) can include a portion that provides a reward rather than a cost. For example, the reward can be of opposite sign to cost(s) provided by other portion(s) of the cost function. Example rewards can be provided for distance traveled, velocity, or other forms of progressing toward completion of a route.

Referring again to FIG. 2, once the optimization planner 208 has identified the optimal candidate motion plan (or some other iterative break occurs), the optimal candidate motion plan can be selected and executed by the autonomous vehicle. For example, the motion planning system 200 can provide the selected motion plan to a vehicle controller 106 that controls one or more vehicle controls (e.g., actuators that control gas flow, steering, braking, etc.) to execute the selected motion plan.

Each of the world state generator 204, scenario controller(s) 206 (e.g., the yield controller 250), the optimization planner 208, and penalty/reward generator 302 can include computer logic utilized to provide desired functionality. In some implementations, each of world state generator 204, scenario controller(s) 206, the optimization planner 208, and penalty/reward generator 302 can be implemented in hardware, firmware, and/or software controlling a general purpose processor. For example, in some implementations, each of world state generator 204, scenario controller(s) 206, the optimization planner 208, and penalty/reward generator 302 includes program files stored on a storage device, loaded into a memory and executed by one or more processors. In other implementations, each of world state generator 204, scenario controller(s) 206, the optimization planner 208, and penalty/reward generator 302 includes one or more sets of computer-executable instructions that are stored in a tangible computer-readable storage medium such as RAM hard disk or optical or magnetic media.

Figure 8:
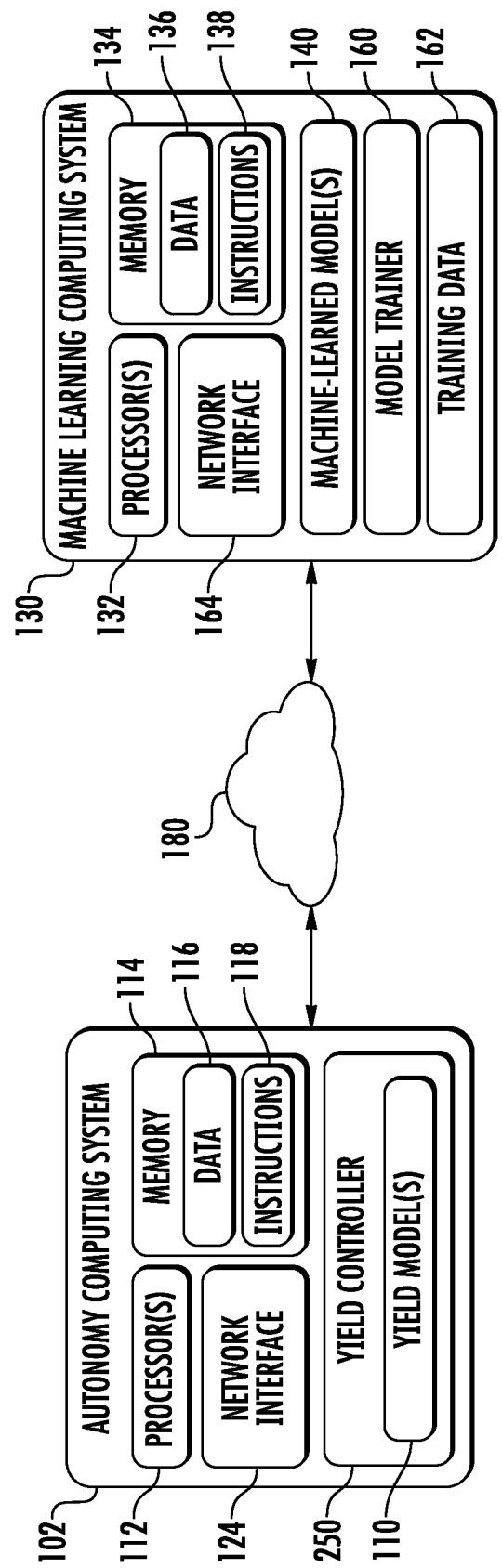
FIG. 8 depicts a block diagram of an example computing system according to example embodiments of the present disclosure.

FIG. 8 depicts a block diagram of an example computing system 100 according to example embodiments of the present disclosure. The example system 100 includes an autonomy computing system 102 and a machine learning computing system 130 that are communicatively coupled over a network 180.

In some implementations, the autonomy computing system 102 can generate yield decisions for or otherwise control the motion of an autonomous vehicle. In some implementations, the autonomy computing system 102 can be included in an autonomous vehicle. For example, the autonomy computing system 102 can be on-board the autonomous vehicle. In other implementations, the autonomy computing system 102 is not located on-board the autonomous vehicle. The autonomy computing system 102 can include one or more distinct physical computing devices.

The autonomy computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. The data 116 can include, for instance, feature data as described herein. In some implementations, the autonomy computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein, including, for example, some or all of the operations described with reference to method 900 of FIG. 9 and/or method 1000 of FIG. 10.

According to an aspect of the present disclosure, the autonomy computing system 102 can store or include one or more machine-learned models 110. As examples, the machine-learned models 110 can be or can otherwise include various machine-learned models such as, for example, neural networks (e.g., deep neural networks), support vector machines, decision tree-based models (e.g., random forests), ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the autonomy computing system 102 can receive the one or more machine-learned models 110 from the machine learning computing system 130 over network 180 and can store the one or more machine-learned models 110 in the memory 114. The autonomy computing system 102 can then use or otherwise implement the one or more machine-learned models 110 (e.g., by processor(s) 112). In particular, the autonomy computing system 102 can implement the machine learned model(s) 110 to generate yield decisions for the autonomous vehicle.

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. The data 136 can include, for instance, feature data as described herein. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein, including, for example, some or all of the operations described with reference to method 900 of FIG. 9 and/or method 1000 of FIG. 10.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the model(s) 110 at the computing system 102, the machine learning computing system 130 can include one or more machine-learned models 140. As examples, the machine-learned models 140 can be or can otherwise include various machine-learned models such as, for example, neural networks (e.g., deep neural networks), support vector machines, decision tree-based models (e.g., random forests), ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 130 can communicate with the autonomy computing system 102 according to a client-server relationship. For example, the machine learning computing system 140 can implement the machine-learned models 140 to provide a web service to the computing system 102. For example, the web service can provide yield decisions.

Thus, machine-learned models 110 can be located and used at the autonomy computing system 102 and/or machine-learned models 140 can be located and used at the machine learning computing system 130.

In some implementations, the machine learning computing system 130 and/or the autonomy computing system 102 can train the machine-learned models 110 and/or 140 through use of a model trainer 160. The model trainer 160 can train the machine-learned models 110 and/or 140 using one or more training or learning algorithms. One example training technique is backwards propagation of errors. In some implementations, the model trainer 160 can perform supervised training techniques using a set of labeled training data. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques.

The model trainer 160 can be implemented in hardware, firmware, and/or software controlling one or more processors. For example, in some implementations, model trainer 160 includes program files stored on a storage device, loaded into a memory and executed by one or more processors. In other implementations, model trainer 160 includes one or more sets of computer-executable instructions that are stored in a tangible computer-readable storage medium such as RAM hard disk or optical or magnetic media.

In particular, the model trainer 160 can train a machine-learned model 110 and/or 140 based on a set of training data 162. The training data 162 can include, for example log data annotated with yield labels. The log data can describe yield behaviors performed by vehicles (e.g., autonomous vehicles and/or humanly-operated vehicles) during previously conducted real-world driving sessions. As another example, training data 162 can include synthesized yield behaviors generated by playing forward or otherwise simulating certain scenarios that are described by log data.

As one example, the yield behaviors (e.g., either real-world or simulated) can be hand-labelled as positive training examples or negative training examples by a human reviewer. As another example, the yield behaviors can be automatically scored using scoring functions. For example, the scoring functions or other labelling rules can be derived from a data analysis of human driving behaviors and/or human passenger feedback. In some implementations, if the yield behavior receives a score that is greater than a first threshold (or less than depending on scoring style) the yield behavior can be labelled as a positive training example; while if the yield behavior receives a score that is less than a second threshold (or greater than depending on scoring style) the yield behavior can be labelled as a negative training example. In some implementations, the first threshold and the second threshold can be the same value. In some implementations, the first threshold and the second threshold can be different values and yield behaviors that receive scores between the first threshold and the second threshold can simply be discarded. In some implementations, the scores provided for the yield behaviors are included as labels to train the yield model, in addition or alternatively to a simple positive or negative label.

In some implementations, each training example can include a pair of outcomes for each of a decision to yield to the object and a decision to not yield to the object. In such implementations, each of the pair of outcomes can be scored and a positive label can be applied to the higher scoring outcome while a negative label is applied to the lower scoring outcome (or vice versa depending on scoring style). In some implementations, in the pair of scores for the pair of outcomes are not sufficiently separate (e.g., their difference is less than a third threshold), then such pair of outcomes can be discarded as a poor training example.

Figure 7:
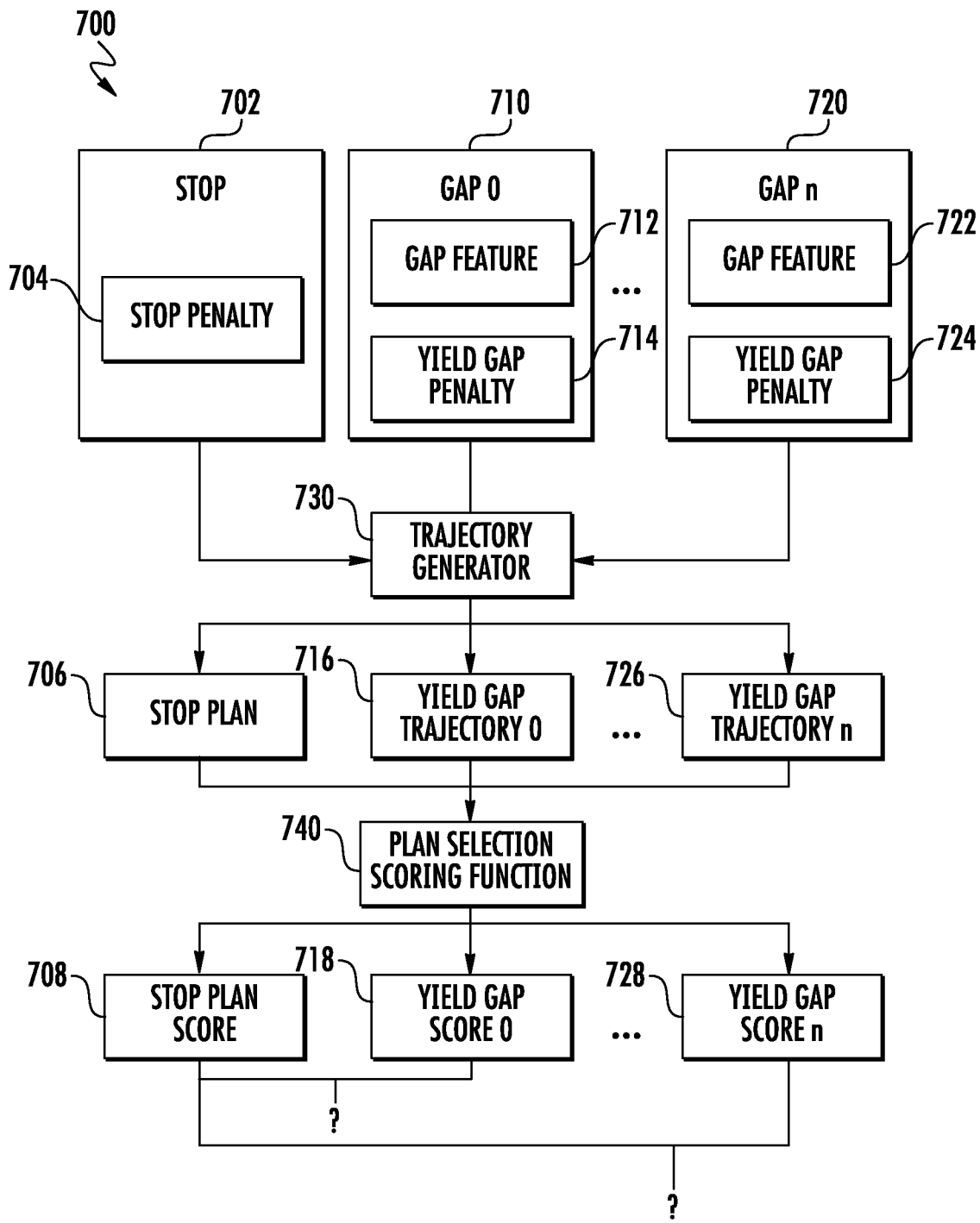
FIG. 7 depicts a block diagram of an example gap labelling scheme according to example embodiments of the present disclosure.

As one example labelling scheme, FIG. 7 depicts a block diagram of an example gap labelling scheme 700 according to example embodiments of the present disclosure. In the scheme 700 each yield gap can be automatically labelled using plan selection scoring logic. In general, a gap can be accepted (e.g., labeled as a positive example) if its trajectory goes through an intersection and produces a better plan score than the stop one. Otherwise the gap can be rejected (e.g., labelled as a negative example). Additionally or alternatively, a gap can be rejected if it breaks any rule. For example, a gap can be rejected if it requires greater than an acceptable amount of acceleration in order to shoot into the gap.

More particularly, with reference to FIG. 7, a stop 702 and one or more gaps such as a $0^{th}$ gap 710 and an $n^{th}$ gap 720 can be evaluated. The gaps can be real gaps observed during a real-world driving session or can be synthetic gaps. The stop 702 can have a stop penalty 704. The gaps 710 and 720 can have gap feature data 712 and 722 and yield gap penalties 714 and 724, respectively. The penalties 704, 714, and 724 can be, for example, similar to the penalties discussed with reference to FIG. 6.

A trajectory generator 730 can generate (e.g., based on the respective penalties 704, 714, and 724) a stop plan 706 for the stop 702, a $0^{th}$ yield gap trajectory 716 for the $0^{th}$ gap 710, and an $n^{th}$ gap trajectory 726 for the $n^{th}$ gap 720. The trajectories can describe the vehicle stopping in the case of plan 706 or traversing through the corresponding gap in the case of trajectories 716 and 726.

A plan selection scoring function 740 can determine a respective score 708, 718, and 728 for each of the plans/ trajectories 706, 716, and 726. For example, the scoring function 740 can apply the scoring logic that is used by the motion planning system to generate and select motion plans. The scoring logic can consider various outcomes or other features such as required acceleration, decoration, likelihood of collision, etc.

In some implementations, the score 718 and 728 for each gap 710 and 720 can be compared to the stop plan score 708 to determine a label for the gap 710 and 720 and/or its corresponding trajectory 716 and 726. Thus, in one example, if the $0^{th}$ yield gap score 718 is greater than or otherwise superior to the stop plan score 708, then the $0^{th}$ gap 710 can be assigned a positive label. As a contrary example, if the nth yield gap score 728 is less than or otherwise inferior to the stop plan score 708, then the nth gap 720 can be assigned a negative label. In some implementations, additional rules or criteria may be required to be satisfied in order for a gap to receive a positive label.

In such fashion, the machine-learned yield model can be trained on training examples with such labels to, once trained, provide yield decisions that instruct an autonomous vehicle to traverse through gaps that would receive higher scores than simply coming to a stop.

Referring again to FIG. 8, the autonomy computing system 102 can also include a network interface 124 used to communicate with one or more systems or devices, including systems or devices that are remotely located from the computing system 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the machine learning computing system 130 can include a network interface 164.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 8 illustrates one example computing system 100 that can be used to implement the present disclosure. Other computing systems can be used as well. For example, in some implementations, the autonomy computing system 102 can include the model trainer 160 and the training dataset 162. In such implementations, the machine-learned models 110 can be both trained and used locally at the computing system 102. As another example, in some implementations, the autonomy computing system 102 is not connected to other computing systems.

In addition, components illustrated and/or discussed as being included in one of the computing systems 102 or 130 can instead be included in another of the computing systems 102 or 130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Example Methods

Figure 9:
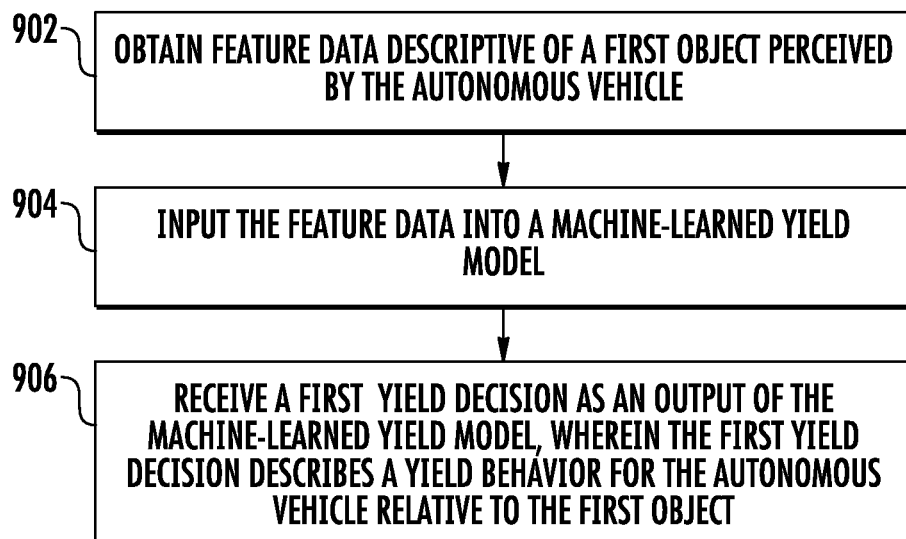
FIG. 9 depicts a flow chart diagram of an example method to control an autonomous vehicle according to example embodiments of the present disclosure.

FIG. 9 depicts a flow chart diagram of an example method 900 to control an autonomous vehicle according to example embodiments of the present disclosure.

At 902, a computing system can obtain first feature data descriptive of a first object perceived by the autonomous vehicle.

As one example, the first object can be a traffic signal and the first feature data can be descriptive of a transition timing associated with the traffic signal.

As another example, the first feature data descriptive of the first object can include or describe at least one of a required deceleration and a required acceleration associated with the first object.

As yet another example, the first object can be traffic signal and the first feature data can be descriptive of at least one of: a stop line location associated with the traffic signal; a cross traffic line location associated with the traffic signal; and an exit point location associated with the traffic signal.

As another example, in some implementations, obtaining the first feature data at 902 can include determining gap data descriptive of one or more gaps associated with one or more additional vehicles perceived by the autonomous vehicle. In some implementations, the one or more gaps associated with the one or more additional vehicles can be one or more temporal gaps that are predicted to occur.

Figure 10:
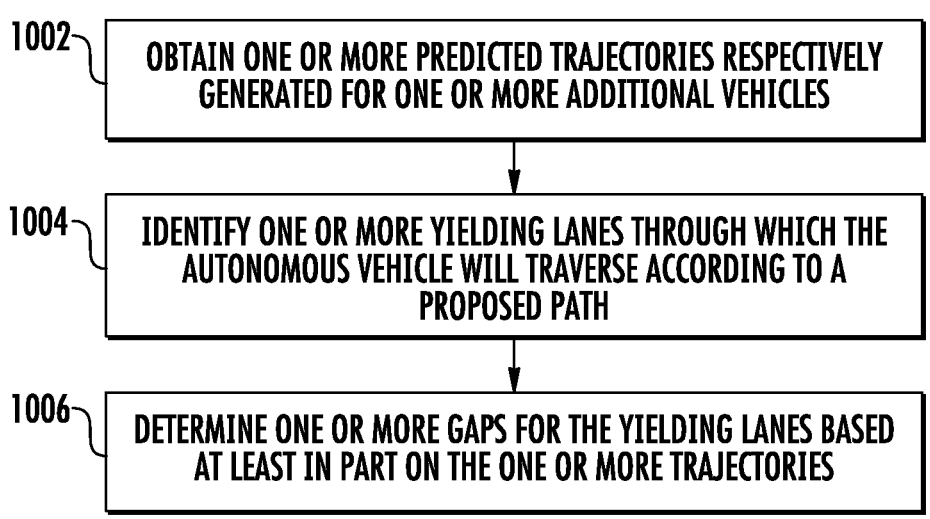
FIG. 10 depicts a flow chart diagram of an example method to extract gap information according to example embodiments of the present disclosure.

As an example method to extract gap information at 902 of FIG. 9, FIG. 10 depicts a flow chart diagram of an example method 1000 to extract gap information according to example embodiments of the present disclosure.

At 1002, a computing system can obtain one or more predicted trajectories respectively generated for one or more additional vehicles.

At 1004, the computing system can identify one or more yielding lanes through which the autonomous vehicle will traverse according to a proposed path.

At 1006, the computing system can determine one or more gaps for the yielding lanes based at least in part on the one or more trajectories.

Referring again to FIG. 9, at 904, the computing system can input the first feature data into a machine-learned yield model. The machine-learned yield model can be configured to receive and process feature data descriptive of objects perceived by the autonomous vehicle and, in response, provide yield decisions for the autonomous vehicle relative to the objects.

As one example, the machine-learned yield model can be or include a machine-learned yield classifier model. As another example, the machine-learned yield model can be or include a machine-learned random forest model. As another example, the machine-learned yield model can be or include a machine-learned neural network.

At 906, the computing system can receive a first yield decision as an output of the machine-learned yield model. The first yield decision can describe a yield behavior for the autonomous vehicle relative to the first object.

In some implementations in which the first feature data is or includes gap data descriptive of one or more gaps, the first yield decision output by the machine-learned yield model can instruct the autonomous vehicle to proceed through a particular gap of the one or more gaps or to come to a stop.

In some implementations in which the first feature data is or includes gap data descriptive of a plurality of gaps, receiving the first yield decision at 906 can include obtaining, through implementation of the machine-learned yield model, a plurality of scores respectively for the plurality of gaps; and selecting a particular gap of the plurality of gaps based at least in part on the plurality of scores.

In some implementations, the method 900 can further include generating, by the computing system, a motion plan that executes the yield behavior described by the first yield decision output by the machine-learned yield model. For example, in some implementations, generating the motion plan can include generating a gap penalty for a particular gap that has been selected. The gap penalty can be used to guide motion of the autonomous vehicle through the particular gap.

In some implementations, the method 900 can further include controlling, by the computing system, motion of the autonomous vehicle based at least in part on the motion plan.

In some implementations, the method 900 can further include, prior to 902, training the machine-learned yield model. As one example, training the machine-learned yield model can include training the machine-learned yield model based at least in part on log data annotated with yield labels. For example, the log data can describe yield behaviors performed by autonomous vehicles during previously conducted real-world driving sessions.

As another example, training the machine-learned yield model can include generating a plurality of synthetic autonomous vehicle trajectories; simulating an outcome for each synthetic autonomous vehicle trajectory; assigning a yield label for each synthetic autonomous vehicle trajectory based at least in part on the outcome for such synthetic autonomous vehicle trajectory; and training the machine-learned yield model based at least in part on the yield labels assigned to the synthetic autonomous vehicle trajectories.

As another example, training the machine-learned yield model can include generating a plurality of gap labels on which the machine-learned yield model is trained. In some implementations, generating the plurality of gap labels can include determining a plurality of example gaps; determining a plurality of trajectories that respectively traverse through the plurality of example gaps; and determining a plurality of scores respectively for the plurality of trajectories. For example, the computing system can label as a positive training example each example gap for which the corresponding trajectory has a score that is greater than a stop score associated with a stop plan and does not violate one or more constraints; and can label as a negative training example each example gap for which the corresponding trajectory has a score that is less than the stop score associated with the stop plan or violates at least one of the one or more constraints.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 9 and 10 respectively depict steps performed in a particular order for purposes of illustration and discussion, the methods of the present disclosure are not limited to the particularly illustrated order or arrangement. The various steps of the methods 900 and 1000 can be omitted, rearranged, combined, and/or adapted in various ways without deviating from the scope of the present disclosure.

What is claimed is:

1. A computing system for an autonomous vehicle, the computing system comprising:
   one or more processors; and
   one or more non-transitory computer-readable media that store instructions that, when executed by the one or more processors, cause the computing system to perform operations, the operations comprising:
   (a) obtaining data descriptive of a plurality of gaps associated with a plurality of vehicles perceived by the autonomous vehicle, wherein the plurality of gaps comprises gaps that are predicted to be created by two or more of the plurality of vehicles;
   (b) processing the data descriptive of the plurality of gaps with a machine-learned yield model to generate an output indicative of a plurality of scores respectively for the plurality of gaps;
   (c) based at least in part on the plurality of scores, selecting a particular gap of the plurality of gaps through which the autonomous vehicle should proceed;
   (d) generating a motion plan that comprises a trajectory for the autonomous vehicle to travel through the particular gap of the plurality of gaps; and
   (e) controlling motion of the autonomous vehicle based at least in part on the trajectory.

2. The computing system of claim 1, wherein generating the motion plan comprises generating a gap penalty for the particular gap of the plurality of gaps, wherein the gap penalty is used to guide motion of the autonomous vehicle through the particular gap.

3. The computing system of claim 1, wherein the machine-learned yield model is trained to process feature data associated with the plurality of vehicles perceived by the autonomous vehicle, wherein the output is based at least in part on the feature data.

4. The computing system of claim 3, wherein the feature data is indicative of at least one of: (i) a location of at least one vehicle relative to a travel way or (ii) a location of at least one vehicle relative to the autonomous vehicle.

5. The computing system of claim 3, wherein the feature data is indicative of at least one of: (i) an acceleration of the autonomous vehicle relative to at least one vehicle of the plurality of vehicles or (ii) a deceleration for the autonomous vehicle to yield relative to at least one vehicle of the plurality of vehicles.

6. The computing system of claim 3, wherein the feature data is indicative of at least one of a location or a movement of at least one vehicle in the plurality of vehicles relative to a location or a movement of another vehicle in the plurality of vehicles.

7. The computing system of claim 1, wherein the particular gap is determined based at least in part on a jerk limit indicative of an acceleration threshold associated with passenger discomfort.

8. The computing system of claim 1, wherein the operations further comprise:

obtaining predicted trajectories for one or more of the plurality of vehicles, wherein the plurality of gaps are based at least in part on the predicted trajectories.

9. The computing system of claim 1, wherein the autonomous vehicle is an autonomous truck.

10. A computer-implemented method comprising:
(a) obtaining data descriptive of a plurality of gaps associated with a plurality of vehicles perceived by the autonomous vehicle, wherein the plurality of gaps comprise gaps that are predicted to be created by two or more of the plurality of vehicles;
(b) processing the data descriptive of the plurality of gaps with a machine-learned yield model to generate an output indicative of a plurality of scores respectively for the plurality of gaps;
(c) based at least in part on the plurality of scores, selecting a particular gap of the plurality of gaps through which the autonomous vehicle should proceed; and
(d) generating a motion plan that comprises a trajectory for the autonomous vehicle to travel through the particular gap of the plurality of gaps.

11. The computer-implemented method of claim 10, further comprising:
(e) controlling motion of the autonomous vehicle based at least in part on the trajectory.

12. The computer-implemented method of claim 10, wherein the machine-learned yield model is trained to generate the output based at least in part on feature data associated with the plurality of vehicles perceived by the autonomous vehicle.

13. The computer-implemented method of claim 12, wherein the feature data is indicative of at least one of: (i) a location of at least one vehicle or (ii) a location of at least one vehicle relative to the autonomous vehicle.

14. The computer-implemented method of claim 12, wherein the feature data is indicative of at least one of: (i) an acceleration for the autonomous vehicle relative to at least one vehicle of the plurality of vehicles or (ii) a deceleration for the autonomous vehicle to yield relative to at least one vehicle of the plurality of vehicles.

15. The computer-implemented method of claim 10, wherein the particular gap is determined based at least in part on an acceleration associated with passenger discomfort.

16. The computer-implemented method of claim 10, wherein the plurality of gaps are based at least in part on a plurality of predicted trajectories for the plurality of vehicles.

17. An autonomous vehicle comprising:
one or more processors; and
one or more non-transitory computer-readable media that store instructions that, when executed by the one or more processors, cause the computing system to perform operations, the operations comprising:
(a) obtaining data descriptive of a plurality of gaps associated with a plurality of objects perceived by the autonomous vehicle, wherein the plurality of gaps comprise gaps that are predicted to be created by two or more of the plurality of objects;
(b) processing the data descriptive of the plurality of gaps with a machine-learned yield model to generate an output indicative of a plurality of scores respectively for the plurality of gaps;
(c) based at least in part on the plurality of scores, selecting a particular gap of the plurality of gaps through which the autonomous vehicle should proceed;
(d) generating a motion plan that comprises a trajectory for the autonomous vehicle to travel through the particular gap of the plurality of gaps; and
(e) controlling motion of the autonomous vehicle based at least in part on the trajectory.

18. The autonomous vehicle of claim 17, wherein the trajectory allows the autonomous vehicle to travel through the particular gap to be located between two objects of the plurality of objects.

19. The autonomous vehicle of claim 17, wherein the operations further comprise:
determining predicted trajectories for at least some of the plurality of objects, wherein the particular gap is based at least in part on the predicted trajectories.

* * * * *